(12) United States Patent
Cho

(10) Patent No.: US 9,895,982 B2
(45) Date of Patent: Feb. 20, 2018

(54) VEHICLE DRIVING SYSTEM AND METHOD

(71) Applicant: Hyundai Mobis Co., Ltd., Seoul (KR)

(72) Inventor: Young Jae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/799,992

(22) Filed: Jul. 15, 2015

(65) Prior Publication Data

US 2016/0023559 A1 Jan. 28, 2016

(30) Foreign Application Priority Data

Jul. 25, 2014 (KR) .................. 10-2014-0094729

(51) Int. Cl.
*B60L 11/18* (2006.01)

(52) U.S. Cl.
CPC ........... *B60L 11/18* (2013.01); *B60L 11/1861* (2013.01); *B60L 11/1868* (2013.01); *Y02T 10/7005* (2013.01); *Y02T 10/7044* (2013.01); *Y02T 10/7066* (2013.01)

(58) Field of Classification Search
CPC .. B60L 11/18; B60L 11/1868; B60L 11/1861; Y02T 10/7241; Y02T 10/7022; Y02T 10/6221; Y02T 10/7077; Y02T 10/642; Y02T 10/7005
See application file for complete search history.

(56) References Cited

U.S. PATENT DOCUMENTS

| | | | |
|---|---|---|---|
| 2003/0029654 A1* | 2/2003 | Shimane | B60K 6/28 180/65.29 |
| 2007/0159007 A1* | 7/2007 | King | B60L 11/1864 307/71 |
| 2009/0183934 A1* | 7/2009 | Oyobe | B60K 6/26 180/65.265 |
| 2010/0090525 A1* | 4/2010 | King | B60L 11/1868 307/10.1 |
| 2010/0133913 A1* | 6/2010 | Iida | B60L 11/1868 307/82 |
| 2011/0057658 A1* | 3/2011 | Yugou | B60L 7/10 324/426 |
| 2012/0049771 A1* | 3/2012 | Komatsu | B60K 6/442 318/139 |
| 2012/0187887 A1* | 7/2012 | Sone | B60L 11/1868 318/504 |
| 2013/0175857 A1* | 7/2013 | Shreevani | B60L 3/0023 307/9.1 |
| 2013/0221920 A1* | 8/2013 | Sugiyama | B60L 3/003 320/109 |
| 2013/0293192 A1* | 11/2013 | Abe | B60L 11/123 320/108 |

* cited by examiner

*Primary Examiner* — Shawki S Ismail
*Assistant Examiner* — Muhammad S Islam
(74) *Attorney, Agent, or Firm* — NSIP Law

(57) ABSTRACT

Disclosed are a vehicle driving system and method. According to an embodiment of the present invention, the vehicle driving system converts a voltage of a second battery section, which supplies power to electric parts inside a vehicle, into a voltage of a first battery section, which supplies power to an inverter for operating a motor through a converter; and supplies power having the converted voltage to a capacitor of the inverter when the vehicle starts so that the capacitor can be charged with the power. With this, the pre-charge circuit is removed from the battery system to thereby make the battery system inexpensive, small and light weight.

10 Claims, 2 Drawing Sheets

VEHICLE DRIVING SYSTEM AND METHOD

CROSS-REFERENCE TO RELATED APPLICATION

This application claims priority from Korean Patent Application No. 10-2014-0094729, filed on Jul. 25, 2014 in the Korean Intellectual Property Office, the disclosure of which is incorporated herein by reference.

BACKGROUND OF THE INVENTION (a) Field of the Invention

The present invention relates to a vehicle driving system and method, and more particularly to a system and method for driving a motor after pre-charging a capacitor included in an inverter of an electric vehicle.

(b) Description of the Related Art

An electric vehicle has been actively studied since it is a highly possible alternative capable of solving vehicle problems on pollution and energy in future.

The electric vehicle (EV) is a vehicle that mainly gets power from a battery to drive an alternating current (AC) or direct current (DC) motor, which is broadly classified into a battery-only electric vehicle and a hybrid electric vehicle. The battery-only electric vehicle employs power from a battery to drive the motor and has to be recharged when the power is used up. On the other hand, the hybrid electric vehicle runs an engine to generate electricity and charge the battery and uses this electricity from the battery to drive the motor.

Further, the hybrid electric vehicle is classified into a series type and a parallel type. In the series hybrid electric vehicle, mechanical energy from the engine is transformed into electric energy trough a generator, and the electric energy is supplied to the battery or the motor so that the vehicle can be always driven by the motor. In other words, the series hybrid electric vehicle is achieved by adding the engine and the generator to the existing electric vehicle in order to increase mileage. On the other hand, the parallel hybrid electric vehicle can be driven by only the motor using the battery power, or only the engine using gasoline or diesel, or both the engine and the motor in accordance with driving conditions.

With recent development of the motor/control technology, there has been developed a high-power, small and high-efficient system. As the DC motor is replaced by the AC motor, the electric vehicle has been greatly improved in output and performance (e.g., accelerating ability and the maximum speed) and thus reached a level comparing favorably with a gasoline vehicle. The high power causes high speed, and thus the motor becomes light and small, thereby decreasing the loading weight or volume of the motor.

In addition, a mild hybrid system has been on the rise. In the mild hybrid system, the electric vehicle employs not a high-voltage battery (e.g., about 270V) but a low-voltage battery (e.g., 48V).

An electric vehicle with this mild hybrid system includes a plurality of relays as a switching means in a battery system, in order to supply or break a current charged in the battery. Further, the battery system of the electric vehicle with the mild hybrid system includes a pre-charge circuit for previously charging a capacitor of an inverter in order to prevent the capacitor from explosion or the like.

Major issues in the low-voltage battery system for the mild hybrid system are how to make the battery system inexpensive, small and lightweight. However, it is difficult to make the battery system inexpensive, small and lightweight since the pre-charge circuit is involved in the battery system.

Accordingly, it is requested to remove the pre-charge circuit from the battery system.

SUMMARY OF THE INVENTION

Accordingly, the present invention is conceived to solve the foregoing problems, and an aspect of the present invention provides a vehicle driving system and method, in which a capacitor of an inverter for supplying power to a motor is pre-charged without a pre-charge circuit.

In accordance with an embodiment of the present invention, there is provided a vehicle driving system including: an inverter which includes a capacitor and operates a motor; a first battery section which supplies power to the inverter; a second battery section which supplies power to electric parts inside a vehicle; and a converter which converts a voltage of the second battery section into a voltage of the first battery section, and supplies power having the converted voltage to the capacitor when the vehicle starts, so that the capacitor can be charged with the supplied power.

The vehicle driving system may further include a controller which measures the voltage of the first battery section, i.e. a first voltage and the voltage of the second battery section, i.e. a second voltage when the vehicle starts, and controls the converter to operate in accordance with difference between the first voltage and the second voltage.

The controller may operate the converter to supply the power having the converted voltage to the capacitor and charge the capacitor if the difference between the first voltage and the second voltage is equal to or higher than a certain value.

The controller may stop operating the converter if the difference between the first voltage and the second voltage is lower than the certain value, and control the first battery section to supply power to the inverter.

The first battery section may include a relay switch to switch connection with the inverter, and the controller may turn on the relay switch so that the first battery section can supply power to the inverter.

The voltage of the first battery section may be higher than the voltage of the second battery section.

The first battery section may include a battery system including a lithium-ion battery, and the second battery section may include a lead storage battery.

In accordance with an embodiment of the present invention, there is provided a vehicle driving method including: converting a voltage of a second battery section, which supplies power to electric parts inside a vehicle, into a voltage of a first battery section, which supplies power to an inverter for operating a motor; and supplying power having the converted voltage to a capacitor of the inverter when the vehicle starts so that the capacitor can be charged with the supplied power.

The converting the voltage may include converting the voltage of the second battery section, i.e. a second voltage into the voltage of the first battery section, i.e. a first voltage if the difference between the first voltage and the second voltage is equal to or higher than a certain value.

The vehicle driving method may further include controlling the first battery section to supply power to the inverter if the difference between the first voltage and the second voltage is lower than the certain value.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Hereinafter, exemplary embodiments of according to the present invention will be described with reference to accompanying drawings.

Figure 1:
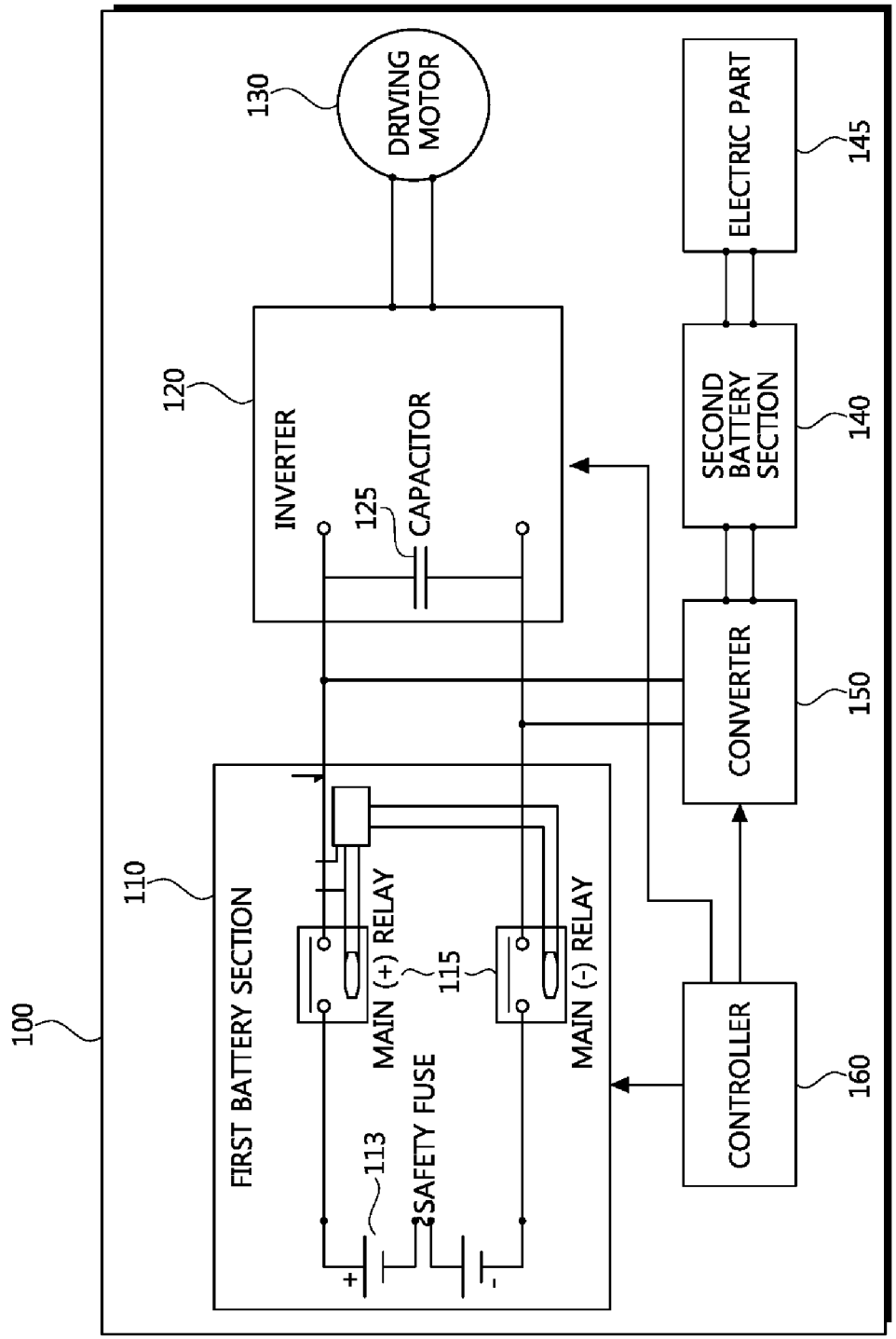
FIG. 1 is a block diagram of a vehicle driving system according to an embodiment of the present invention.

FIG. 1 is a block diagram of a vehicle driving system 100 according to an embodiment of the present invention. As shown in FIG. 1, the vehicle driving system 100 includes a first battery section 110, an inverter 120, a driving motor 130, a second battery section 140, an electric part 145, a converter 150 and a controller 160.

The first battery section 110 is connected to the inverter 120 and supplies electric power. Further, the first battery section 110 includes a relay switch 115 for switching the connection with the inverter 120. Further, the first battery section 110 refers to a battery system including a lithium-ion battery 113 in which a plurality of battery cells are connected in series or parallel.

The inverter 120 includes a capacitor 125, and drives the driving motor 130 with the power supplied from the first battery section 110. The inverter 120 refers to a device that converts DC into AC or coverts AC into DC. That is, the inverter 120 converts DC power received from the first battery section 110 into AC power, and supplies the AC power to the driving motor 130. Further, the inverter 120 converts AC power generated in the driving motor 130 during regenerative braking into DC power, and charges the first battery section 110 with the DC power.

The capacitor 125 is arranged in between the first battery section 110 and the inverter 120, and is also called a DC link capacitor. Since the capacitor 125 is more quickly charged and discharged than the first battery section 110, the capacitor 125 serves to stably supply the power even though the output of the driving motor 130 is suddenly varied, and prevent the first battery section 110 from abrupt change in status.

The driving motor 130 is arranged for driving a vehicle, and its function is varied depending on the kinds of vehicle. For example, if the vehicle is a hybrid vehicle, the driving motor 130 is connected to an engine. If the vehicle is an electric vehicle, the driving motor 130 serves as the engine itself.

The second battery section 140 supplies power to the electric part 145 inside the vehicle. The second battery section 140 may be a lead storage battery. Further, the second battery section 140 is connected to the converter 150 and supplies the power to the capacitor 125 in the inverter 120 so as to charge the capacitor 125 with the power.

The first battery section 110 has a higher voltage than the second battery section 140. For example, the first battery section 110 may have 48V, and the second battery section 140 may have 12V or 24V.

The converter 150 converts the voltage of the second battery section 140 into the voltage of the first battery section 110, and supplies the power of the converted voltage to the capacitor when the vehicle starts, thereby charging the capacitor with the supplied power. For example, if the second battery section 140 has a voltage of 24V and the first battery section 110 has a voltage of 48V, the converter 150 converts the voltage of the second battery section 140 from 24V into 48V, and supplies the power of 48V to the capacitor 125 of the inverter 120.

The controller 160 controls general operations of the vehicle driving system 100. Specifically, the controller 160 measures a voltage of the first battery section 110, i.e. a first voltage and a voltage of the capacitor 125, i.e. a second voltage when the vehicle starts, and controls operations of the converter 150 in accordance with difference between the first voltage and the second voltage.

If the difference between the first voltage and the second voltage is equal to or higher than a certain value, the controller 160 operates the converter 150 to supply the power of the converted voltage to the capacitor 125 so as to charge the capacitor with the supplied power. The certain value corresponds to a critical voltage difference for maintaining the capacitor 125 stable. For instance, the critical value may be 10V. Thus, it is possible to previously charge the capacitor 125 even though the converter 150 does not include any separate pre-charge circuit.

On the other hand, if the difference between the first voltage and the second voltage is lower than the certain value as the capacitor 125 of the converter 150 is charged, the controller 160 stops operating the converter 150 and controls the first battery section 110 to supply power to the inverter 120. Specifically, the controller 160 turns on the relay switch 115 and thus control the first battery section 110 to supply the power to the inverter 120.

With this configuration, the vehicle driving system 100 can previously charge the capacitor when the vehicle starts, without the pre-charge circuit. Thus, the pre-charge circuit is removed from the battery system so that the battery system can be inexpensive, small and lightweight.

Figure 2:
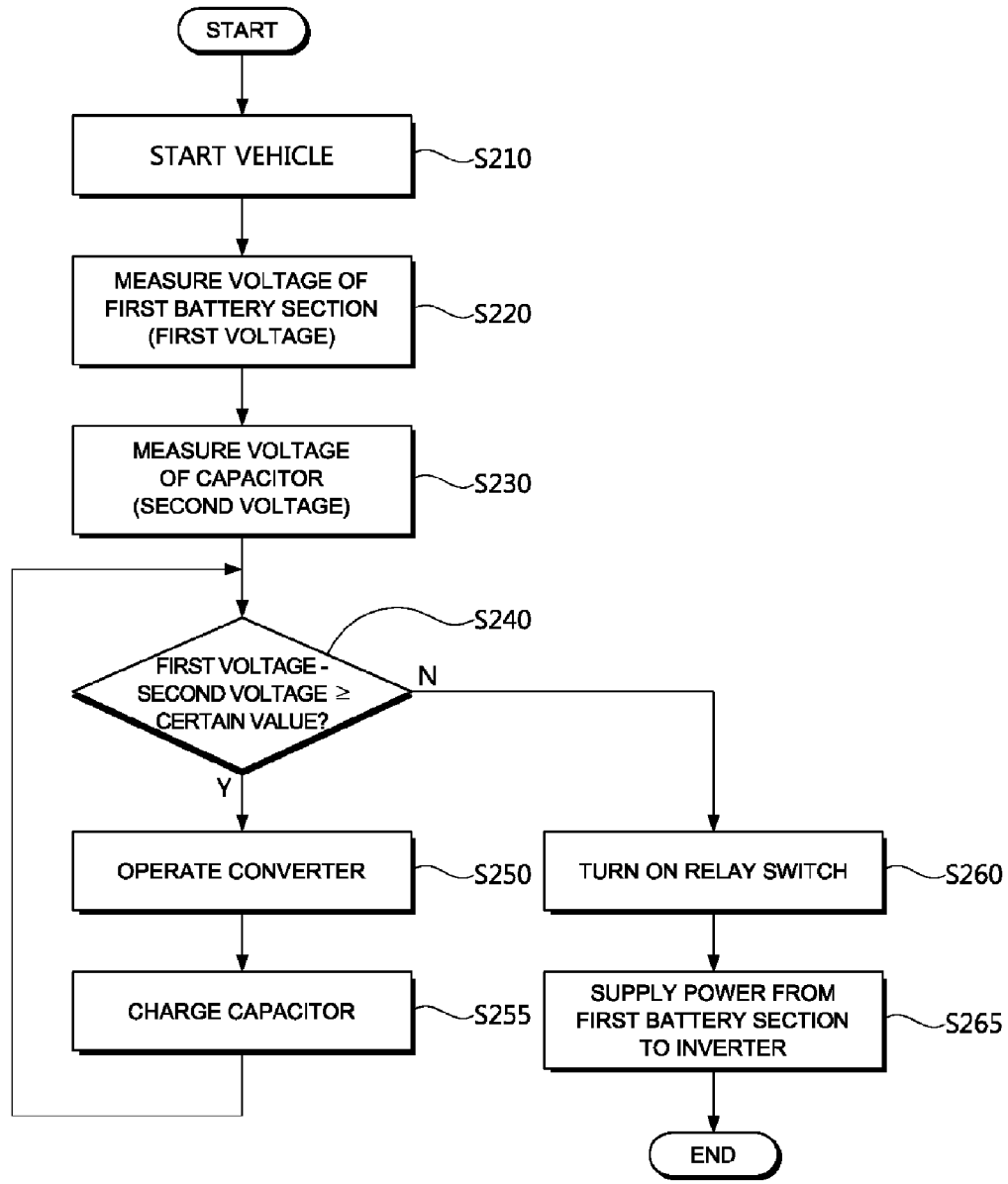
FIG. 2 is a flowchart for explaining a vehicle driving method according to an embodiment of the present invention.

Below, a vehicle driving method will be described in detail with reference to FIG. 2. FIG. 2 is a flowchart for explaining the vehicle driving method according to an embodiment of the present invention.

When a user starts a vehicle (S210), the vehicle driving system 100 measures the first voltage of the first battery section 110(S220) and measures the second voltage of the capacitor 125 in the inverter 120 (S230).

Further, the vehicle driving system 100 determines whether the difference between the first voltage and the second voltage is equal to or higher than the certain value (S240). If the difference between the first voltage and the second voltage is equal to or higher than the certain value (S240-Y), the vehicle driving system 100 operates the converter 150 to boost up the voltage of the second battery section 140 and supply the boosted voltage to the capacitor 125(S250), and charges the capacitor 125(S255). Then, the vehicle driving system 100 returns to S240.

When the difference between the first voltage and the second voltage is lower than the certain value (S240-N), the vehicle driving system 100 stops operating the converter 150 and turns on the relay switch 115(S260), and controls the first battery section 110 to supply power to the inverter 120(S265).

With this process, the vehicle driving system 100 controls the operation of the converter 150 in accordance with the difference between the first voltage and the second voltage, so that the capacitor can be previously charged when the vehicle starts, without any separate pre-charge circuit. Thus, the pre-charge circuit is removed from the battery system, thereby making the battery system inexpensive, small and lightweight.

According to various embodiments of the present invention, the voltage of the battery for supplying power to the electric parts is converted so that the capacitor can be previously charged without any separate pre-charge circuit. Accordingly, it is possible to remove the pre-charge circuit from the battery system, and therefore make the battery system inexpensive, small and lightweight.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A vehicle driving apparatus, comprising:
   a first battery section;
   an inverter comprising a capacitor and configured to operate a motor;
   a second battery section configured to supply a first power to an electric part inside a vehicle; and
   a converter configured to convert a second voltage of the second battery section into a first voltage of the first battery section and to supply a second power having the converted voltage to the capacitor to charge the capacitor, in response to the vehicle starting,
   a controller configured to
      control the first battery section to supply a third power to the inverter, in response to detecting that a difference between the first voltage and the second voltage is lower than a threshold, and
      operate the converter to supply a fourth power having the converted voltage to the capacitor and to charge the capacitor, in response to detecting that the difference between the first voltage and the second voltage is equal to or greater than the threshold,
   wherein the threshold corresponds to a critical voltage difference between the first voltage and the second voltage for maintaining stable operation of the capacitor.

2. The vehicle driving apparatus according to claim 1, wherein the controller is further configured to measure the first voltage and the second voltage, in response to the vehicle starting.

3. The vehicle driving apparatus according to claim 1, wherein the first battery section comprises a relay switch configured to switch a connection of the inverter, and the controller is further configured to turn on the relay switch to enable the controlling of the first battery section to supply the third power to the inverter.

4. The vehicle driving apparatus according to claim 1, wherein the first voltage is higher than the second voltage.

5. The vehicle driving apparatus according to claim 1, wherein
   the first battery section comprises a lithium-ion battery, and
   the second battery section comprises a lead storage battery.

6. The vehicle driving method according to claim 1, wherein the second battery section is connected between the converter and a terminal of the electric part in an electrical circuit, and wherein the terminal is not a ground terminal.

7. The vehicle driving apparatus of claim 1, wherein the converter is connected to a terminal of the electric part via the second battery section, and wherein the terminal is not a ground terminal.

8. The vehicle driving apparatus of claim 1, wherein the threshold is 10 volts.

9. The vehicle driving apparatus of claim 1, wherein the controller is further configured to stop operating the converter, in response to the difference between the first voltage and the second voltage being equal to or greater than the threshold.

10. A vehicle driving method, the method comprising:
    converting a second voltage of a second battery section into a first voltage of a first battery section, in response to detecting that a difference between the first voltage and the second voltage is equal to or higher than a threshold, wherein the second battery section is configured to supply a first power to electric parts inside a vehicle, the first battery section is configured to supply a second power to an inverter for operating a motor, and the threshold corresponds to a critical voltage difference for maintaining stable operation of a capacitor of the inverter;
    controlling the first battery section to supply the second power to the inverter, in response to detecting that the difference between the first voltage and the second voltage is lower than the threshold; and
    supplying a third power having the converted voltage to the capacitor to charge the capacitor, in response to the vehicle starting.

* * * * *